United States Patent [19]

Tilk

[11] 3,852,534

[45] Dec. 3, 1974

[54] METHOD AND APPARATUS FOR SYNCHRONIZING PSEUDORANDOM CODED DATA SEQUENCES

[75] Inventor: Tonis Tilk, Santa Monica, Calif.

[73] Assignee: The United States of America as represented by the Secretary of the Army, Washington, D.C.

[22] Filed: June 7, 1973

[21] Appl. No.: 367,697

[52] U.S. Cl. .............. 179/15 BS, 178/22, 179/1.5 S

[51] Int. Cl. .............. H04j 3/06

[58] Field of Search ........... 179/15 BS, 1.5 R, 1.5 S; 178/69 SR, 22; 325/32, 122

[56] References Cited

UNITED STATES PATENTS

| | | | |
|---|---|---|---|
| 3,530,252 | 9/1970 | Puente | 179/15 BS |
| 3,659,046 | 4/1972 | Angeleri | 178/22 |
| 3,730,998 | 5/1973 | Schmidt | 179/15 BS |

*Primary Examiner*—David L. Stewart

*Attorney, Agent, or Firm*—Edward J. Kelly; Herbert Berl; Jack W. Voight

[57] ABSTRACT

A simple means is provided for maintaining synchronization between pseudorandom generators at separate locations when a communication channel therebetween is being used on a time-shared, non-continuous basis. The pseudorandom coding device changes its coding state once per data bit. A timing system provides timing pulses to a transmitter-receiver circuit and to a pseudorandom coding unit. The coding unit encodes data to be transmitted and decodes data that has been received. Time correlation is maintained between the coding unit and the timing system by utilizing a common time generating source for timing and for clock pulses to the pseudorandom device.

2 Claims, 3 Drawing Figures

METHOD AND APPARATUS FOR SYNCHRONIZING PSEUDORANDOM CODED DATA SEQUENCES

SUMMARY OF THE INVENTION

This invention is a simple method and circuit for maintaining synchronization between pseudorandom generators at separate locations when a communication channel is being used on a time-shared basis. The invention is particularly applicable to systems with propagation times that are varying and/or unknown. The pseudorandom coding device changes its coding state once per data bit. The maximum relative timing error between any stations in a communication system do not exceed some fraction of the data bit length.

DESCRIPTION OF THE PREFERRED EMBODIMENT

Figure 1:
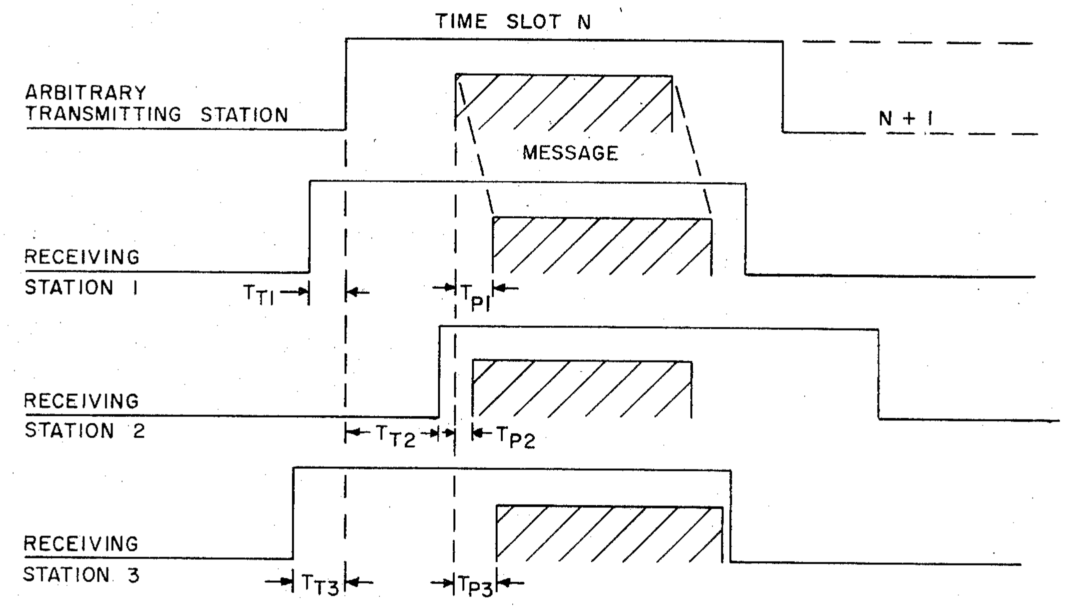
FIG. 1 discloses a typical time slot for an arbitrary transmitting station and several receiving stations with the relative timing error between transmitting and receiving stations shown.

In directing communication signals between separate locations, the propagation delay of the signals can vary from a fraction of a bit-length to several tens of bits, depending on the transmission path length. Variation in propagation time affects the system in the same way as a relative timing error. These variations are introduced by the difference in distance between the stations involved and by propagation discrepancies (multipath) when considering a specific transmission. Sufficient time slot timing synchronization can be maintained for long periods of time within a system to allow communication between stations during respective time slots. FIG. 1 discloses a typical transmitting station and receiving stations 1, 2, and 3 having a common time slot N. A certain time $t_o$ is defined as a maximum timing error between any two stations, such that a message transmitted in time slot N by an arbitrary station will be received by all stations during their individual timing of time slot N. Thus, the time $t_o$ is a function of the different stations' relative timing error and propagation time between the stations. Assuming that the transmission of a message occurs symmetrically with reference to the mid point of a time slot, timed by the transmitting station, the time $t_o$ is the maximum permissible timing error which allows the end of the message transmitted to be received within the same time slot. Thus, in FIG. 1, receiving station 3 indicates the maximum permissible timing error with $t_o = T_{T3} + T_{P3}$. $T_T$ represents relative timing error between start of the time slot of the arbitrary transmitting station and any receiving station. $T_P$ represents the propagation time for the start of the transmitted message to reach a receiving station.

Figure 2:
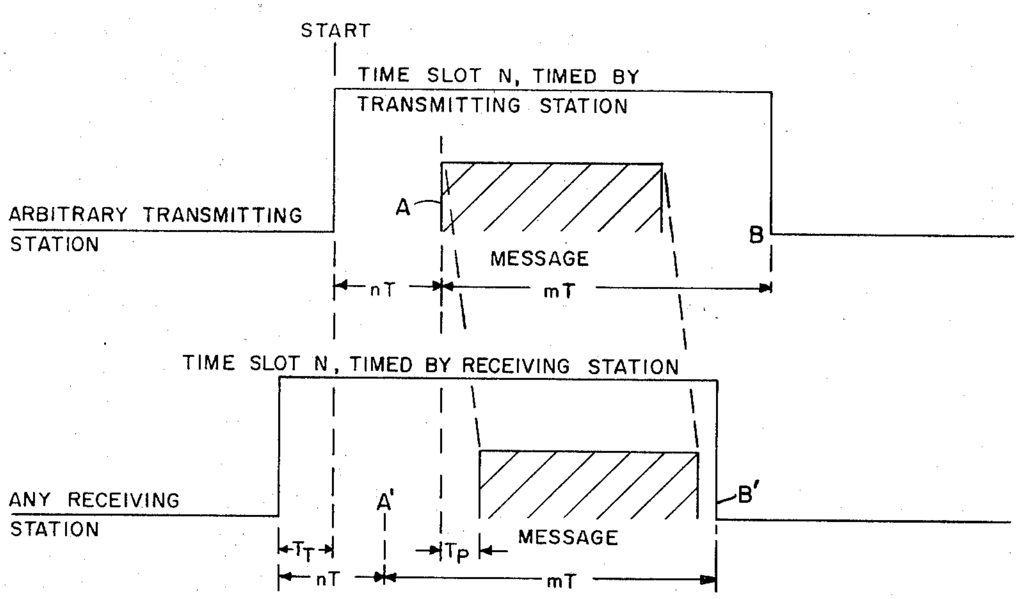
FIG. 2 discloses the time slot for a transmitting station and a receiving station showing the time correlation between the coding unit and time slot timing.

An arbitrary transmitting station transmits its message during a specified time of the time slot. A station always transmits the first message bit a fixed number of bit durations after the leading edge of the time slot (with reference to the timing of the transmitting station). By utilizing the same time generating source both for timing of the time slots and as the generator of clock pulses for a pseudorandom generator, a time correlation is maintained between the pseudorandom coding unit and time slot timing. As shown in FIG. 2, the time slot N is timed by the transmitting station and respective receiving stations. Each time slot N equals the duration of $n+m$ bits ($n$ and $m$ are integers), and message transmission is started $n$ bit lengths after the time slot leading edge. If T is the bit duration, the time slot length becomes $(m+n)\,T$ for each station.

Due to the correlation which is obtained by using the same timing source (same clock pulses) for timing of the time slots and stepping the pseudorandom code bit generator, all pseudorandom units provide the same output at the instant each stations timing indicates start of time slot N. Thus, every station knows which code is being applied by the transmitter for message enciphering. This code is the code bits the pseudorandom generator provides after $nT$ time units after the leading edge of time slot N, and is the same independent of which station transmits. Every received message is made subject to correct deciphering process by delaying the readout of the received message from the shift register 32 to the end of the locally generated time slot B' (FIG. 2) if the deciphering pseudorandom bits are delayed $m$ bit durations with reference to the enciphering bits.

The transmitting station code bits for message enciphering are generated by the pseudorandom bit generator beginning at time A. If the station, designated "any receiving station" had been transmitting, it would have applied codes starting at time A'. However, these codes, starting at A or A' are identical. Thus, independent of the relative time slot synchronization and independent of the transmission delay (propagation time), a receiver can receive a message anywhere in a time slot as long as $t_o$ is not exceeded. A receiver receiving a message anywhere in a time slot and delaying it until the instant of the trailing edge of the locally generated time slot will decipher it correctly since the receiving pseudorandom decoding unit assumes, at the time of the trailing edge of the time slot, the same coding state that the station would have applied to the first bit to be transmitted if that station would have transmitted in the time slot. For a time slot duration of $(n+m)$ bits, and a transmission pattern such that the transmission starts $n$ bit durations after the leading edge of the time slot, the deciphering code must lag the enciphering code with the time equaling the duration of $m$ bits. With a common pseudorandom bit generator, the above characteristics are obtained by delaying the pseudorandom bits in an $m$-stage shift register before applying them to the received message.

The starting instant of deciphering can arbitrarily be selected with certain restrictions. The trailing edge of the time slot constitutes a suitable instant since the same triggering pulse which indicates the start of a new time slot can be utilized to indicate start of deciphering. Depending on the length of the margin time, two receive shift registers may be required. This will be the situation if it is possible that a new reception can start before the receive register has been emptied of the message received during the previous time slot. As they are received, message bits are fed into the receive register by clock pulses which are generated in the receiving circuitry. When stored data is to be deciphered, clock pulses from the station's timing unit are applied to the shift register. The last-mentioned pulses are the same as those being used for timing of the pseudorandom unit, thus, absolutely correct deciphering process timing is attained. The block diagram of FIG. 3 is a transmitting-receiving circuit for providing synchronizing pseudorandom generation.

Figure 3:
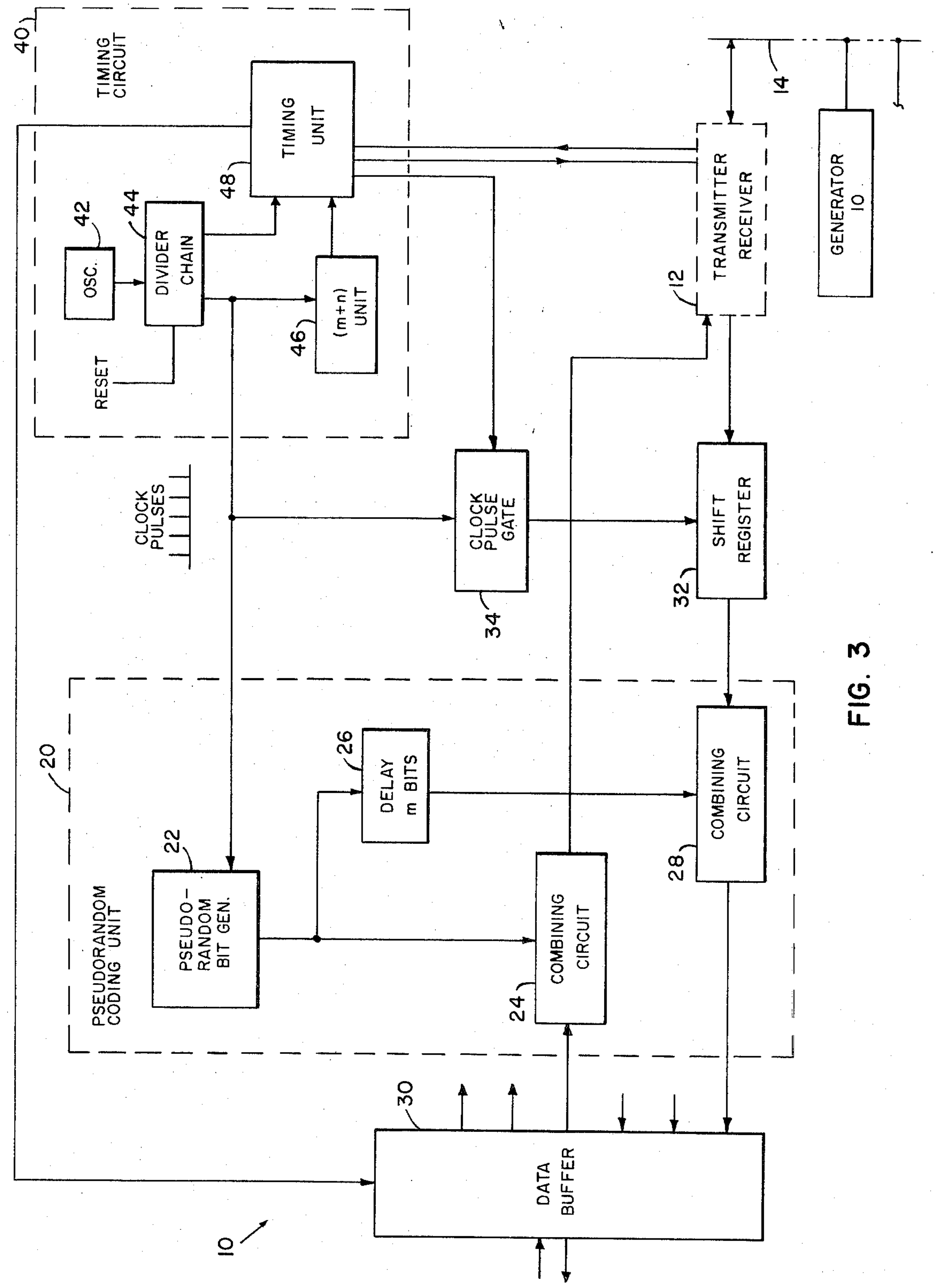
FIG. 3 is a block diagram of a pseudorandom signal generator for transmitting and receiving over a time-shared communication channel.

As set forth in FIG. 3 a pseudorandom generator 10 has a transmitter receiver circuit 12 coupled to a communications link 14 for further coupling to additional pseudorandom generators. A pseudorandom coding unit 20 is coupled on the input side of the transmitter and the output of the receiver for coding data coupled thereto. Within coding unit 20 a pseudorandom bit generator 22 has an output coupled to a combining circuit 24 and to a delay circuit 26 for delaying the output of generator 22 by $m$ bits. The output of delay circuit 26 is coupled to another combining circuit 28. A buffer circuit 30 couples data to be encoded into combining circuit 24 of coding unit 20. This data input is coded with the output of bit generator 22 and coupled to transmitter receiver 12 for transmission. Similarly, received signals are coupled out of transmitter receiver 12 and into shift register 32. Register 32 is gated by a clock pulse gate 34 to provide an output to combining circuit 28. The output of delay circuit 26 is then combined with the output of shift register 32 in the combining circuit providing a decoded output signal to the buffer 30. A timing circuit 40 provides the clock pulses for the system. Timing circuit 40 comprises an oscillator 42 having an output coupled to a divider chain 44. An output of the divider chain is coupled to bit generator 22 and to clock pulse gate 34 for providing clock pulses thereto. Within the timing circuit, divider chain 44 is coupled to an $(m + n)$ divider 46 and to a timing unit 48. The output of divider 46 is also coupled as an input to timing unit 48. An output of timing unit 48 is coupled to clock pulse gate 34 and an input and output network is coupled between timing unit 48 and transmitter receiver 12. An output is also coupled from timing unit 48 to buffer 30 for activating the buffer prior to transmit and receive operation.

Divider chain 44 provides the basic timing clock pulses. The period of these clock pulses is, for this embodiment, equal to the duration of a data bit but this is not a general requirement. At time $t = 0$ the pseudorandom bit generator and $(m + n)$ divider are simultaneously reset at every station. Thus, at time $t = 0$, all pseudorandom bit generators and time slot generators are in synchronism. At $N (m + n)$ clock pulses after $t = 0$ (where $N$ is an arbitrary integer) all pseudorandom generators provide the same output code and the $m + n$ dividers indicate start of a new time slot. The time slot timing correction (reset) is performed by affecting the divider chain, hence, the correlation between the pseudorandom bit generator timing and the time slot timing is not distrubed by timing corrections elsewhere in the system. A reset input is coupled to divider 44 for coupling the reset signal thereto.

During transmission, station 10 will not start the message transmission prior to the $n$-th bit time unit after its timing indicates start of time slot N. "$n$" pulses after the time slot leading edge, timing unit 48 gives a command to the data buffer to start feeding the message to be transmitted into the pseudorandom coding unit 20. The message enciphering takes place in this unit. The first message bit will be enciphered by the code that bit generator 22 supplies after $(N - 1)(m + n) + n$ clock pulses after the instant $t = 0$. The subsquent data will be enciphered by codes which correspond to consecutive clock pulses.

When all bits are transmitted, timing unit 48 will cease the transmit command to data buffer 30. All but one function performed by timing unit 48 are independent of the coding unit 20. The dependent function is the requirement that the logic in all timing units are wired to command start of transmission $n$ clock pulses after the individual stations $(m + n)$ divider 46 indicates start of a new time slot.

A receiving station receives the message and feeds it into shift register 32. When the timing of the receiving station indicates the end of the time slot, the timing unit 48 of that station furnishes an output which activates gate 34 and thereby enables the clock pulses to start shifting out the received data from shift register 32. At that instant the pseudorandom bit generator 22 of that receiving station 10 provides a code output which corresponds to $N (m + n)$ clock pulses with reference to time $t = 0$. If the delay line (shift register) that provides deciphering bits to receiver combining circuit 28, exhibits a delay corresponding to $m$ bits, the first received data bit will be deciphered by the code that bit generator 22 provided after $N (m + n) - m$ clock pulses. However, $N (m + n) - m = (N - 1)(m + n) + n$ which is exactly the code that transmitting station 10 applied to encipher the first bit of the transmitted message. Thus, subsequent data bits are processed by the same consecutive coding bits as those used by the transmitter.

The pseudorandom devices and time slot number generators of all involved stations are reset simultaneously on command if desired. This allows reestablishment of the reference instant when all pseudorandom devices are in perfect synchronism. Thus, where communication systems use a common radio channel on a time sharing basis, and individual stations cannot maintain the exact synchronism the pseudorandom coding generator maintains synchronism.

Although a particular embodiment and form of this invention has been illustrated, it is apparent that various modifications and embodiments of the invention may be made by those skilled in the art without departing from the scope and spirit of the foregoing disclosure. Accordingly, the scope of the invention should be limited only by the claims appended hereto.

I claim:

1. A method of maintaining synchronization between pseudorandom generators at separate locations when a communication channel is being used on a time shared, non-continuous basis, comprising the steps of:

generating, by individual stations, a periodic time period for transmission or reception of a communications signal during the time period;

transmitting message bits a fixed number of bit durations after the leading edge of the time period;

coding said message bits with the output from a pseudorandom bit generator;

time correlating said coding and said time period with a common time generating source;

receiving transmitted messages by a receiver station;

delaying the received message until the instant of the trailing edge of the time period; and deciphering the delayed message by combining the message with coding bits from a pseudorandom bit generator.

2. Asystem for synchronizing communication signals transmitted over a common transmission medium, the system having a plurality of stations each comprising:

a. a transmitter and receiver for coupling signals to and from the common transmission medium;

b. storage apparatus coupled to said receiver for storing signals from the receiver as received and for providing those signals to an output upon receipt of control signals;

c. pseudorandom means for coding data prior to transmission and decoding received data comprising 1. a transmitting and a receiving combining circuit for providing signals to the transmitter after encoding and for receiving the output of said storage apparatus for decoding, respectively, and 2. a pseudorandom generator for providing an undelayed output to said transmitting combining circuit and a delayed output to said receiving combining circuit;

d. a buffer circuit for providing data to and receiving data from said combining circuits; and e. a timing circuit for defining a multibit local time slot, for providing control signals to said buffer to initiate application of data from said buffer to said transmitting combining circuit a predetermined number of bits after the start of said local time slot, for activating said pseudorandom generator, and for providing said control signals to said storage apparatus at the end of said local time slot.

* * * * *